May 29, 1928.

A. M. JOSEPHO

1,671,644

AUTOMATIC CAMERA FOR TAKING TIMED SEQUENCES OF PORTRAITS

Filed Sept. 15, 1923    6 Sheets-Sheet 1

Anatol M. Josepho
INVENTOR

BY Victor J. Evans
ATTORNEY

WITNESS:

May 29, 1928.

A. M. JOSEPHO

1,671,644

AUTOMATIC CAMERA FOR TAKING TIMED SEQUENCES OF PORTRAITS

Filed Sept. 15, 1923   6 Sheets-Sheet 3

May 29, 1928.

A. M. JOSEPHO 1,671,644

AUTOMATIC CAMERA FOR TAKING TIMED SEQUENCES OF PORTRAITS

Filed Sept. 15, 1923   6 Sheets-Sheet 6

Anatol M. Josepho, INVENTOR

BY Victor J. Evans ATTORNEY

Patented May 29, 1928.

1,671,644

UNITED STATES PATENT OFFICE.

ANATOL M. JOSEPHO, OF NEW YORK, N. Y., ASSIGNOR TO PHOTOMATON INC., OF NEW YORK, N. Y., A CORPORATION OF NEW YORK.

AUTOMATIC CAMERA FOR TAKING TIMED SEQUENCES OF PORTRAITS.

Application filed September 15, 1923. Serial No. 662,921.

This invention relates to a photographic apparatus designed to take a series of photographs showing the sitter in different positions and registering expressions and emotions displayed by him while the exposures are being made.

The general object of the invention is to provide means whereby upon the depositing of a coin in the apparatus, a series of pictures will be taken of a person, in rapid succession, upon a strip of sensitized material and the developed strip delivered after a short interval of time without effort on the part of the sitter.

Another object of the invention is to provide electrical means for carrying out the various operations, the coin closing a switch to begin the initial operation.

A still further object of the invention is to provide means for actuating the shutter of the apparatus by the strip feeding means so that the strip will be stationary when the shutter is open.

Another object of the invention is to provide means for illuminating the sitter by a lamp to which current is supplied just after a coin has been deposited in the apparatus.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 30 is a similar view with the knife in projected position.

Figure 31 is a section on line 31—31 of Figure 12.

Figure 32 is a section on line 32—32 of Figure 31.

Figure 33 is a section on line 33—33 of Figure 31.

Figure 1:
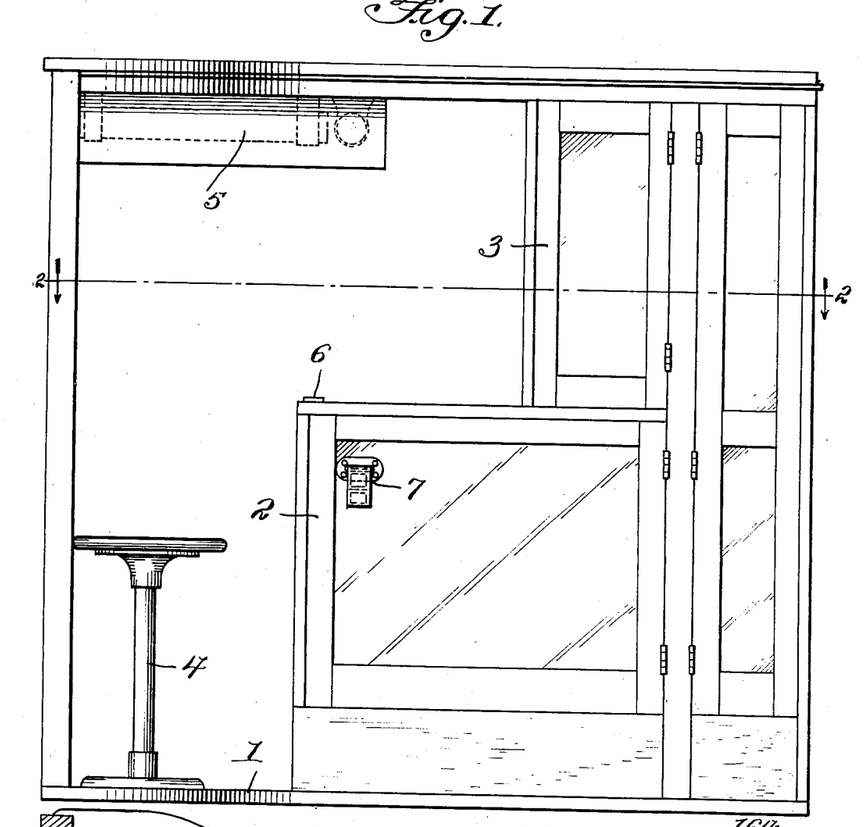
Figure 1 is an elevation of the complete apparatus.
Figure 2:
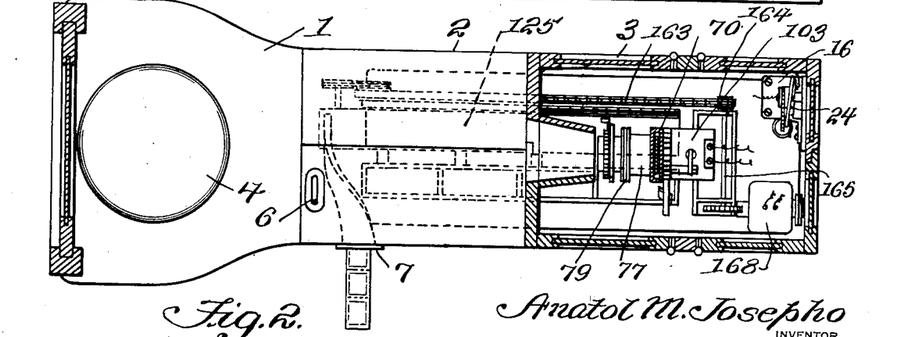
Figure 2 is a section on line 2—2 of Figure 1.

In these views, 1 indicates a frame to a part of which are hinged the lower casing parts 2 and the upper casing parts 3, the lower casing being of greater length than the upper casing, as shown in Figures 1 and 2. By making the casings in sections and hinging the sections the parts enclosed thereby are easily accessible. A seat 4 is placed on the floor of the frame in front of the casings and illuminating means 5 are placed on the top of the frame in position to illuminate a person occupying the seat. A coin chute 6 is carried by the top of the lower casing with its mouth in a position where a coin can be placed therein by a person occupying the seat. A delivery chute 7 is arranged at one side of the lower casing for delivering the finished pictures and I prefer to arrange this delivery chute a distance from the seat so that a person must leave the seat in order to receive the pictures, thus leaving the seat free to be used by another person.

Figures 4, 5, 6, 7, 8, 9, 10:
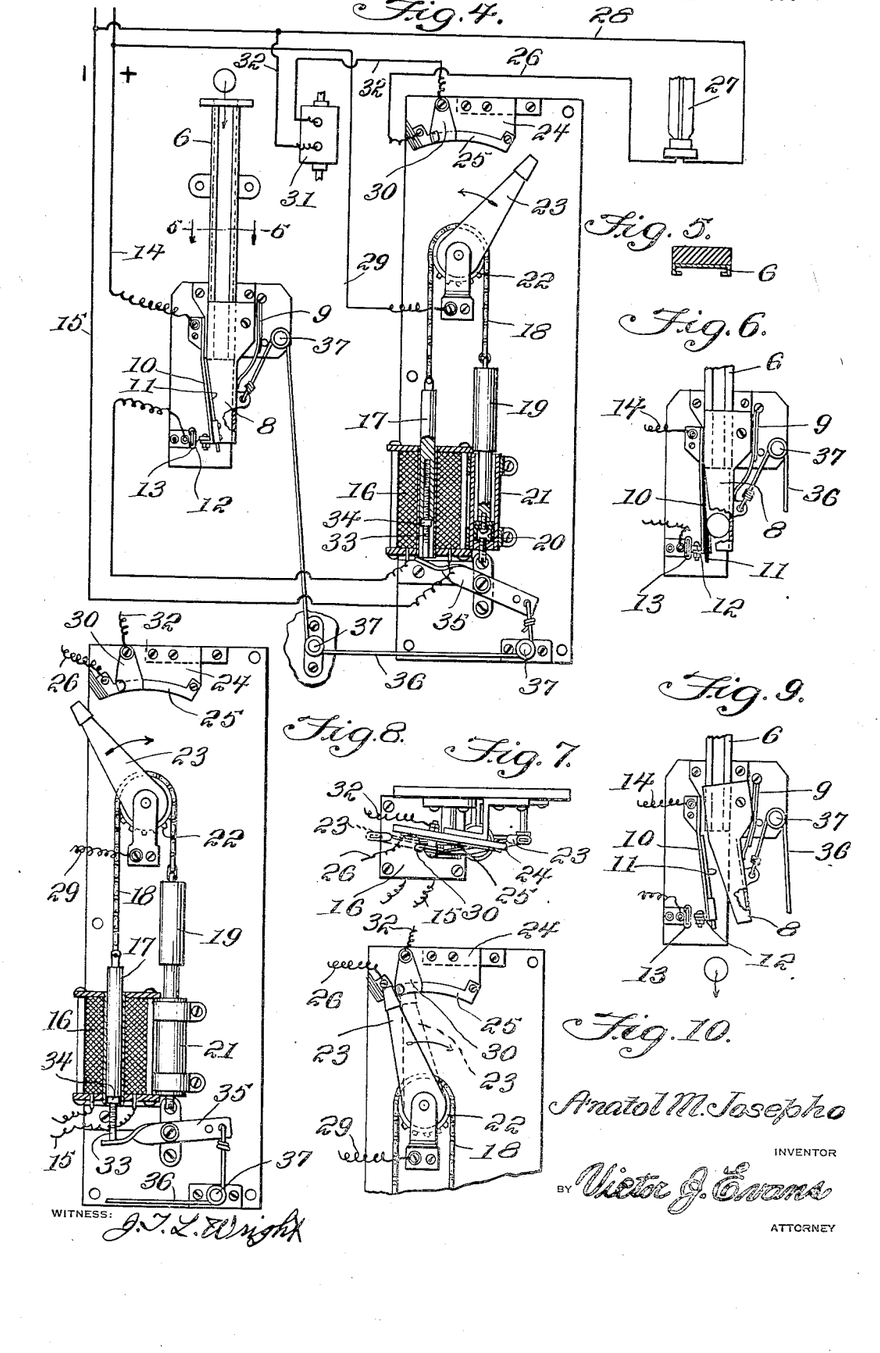
Figure 4 is a diagrammatic view of the parts which are actuated as soon as a coin is deposited in the apparatus.
Figure 5 is a section on line 5—5 of Figure 4.
Figure 6 is a view of the lower part of the coin chute showing the switch closed by a coin.
Figure 7 is a top plan view of the switch.
Figure 8 is a view of the magnetic switch with the switch arm in its left hand limit of movement.
Figure 9 is a view showing the parts of the coin chute in a position to release the coin.
Figure 10 is a view showing the switch arm moving towards the right and just engaging the contact slide.

The lower part of the coin chute is provided with a hinged member 8 which is of angle shape in cross section and is normally held in a position for receiving a coin from the chute by means of the spring 9. The front edge of this member is beveled and this edge is engaged by a spring switch 10, which carries a strip of insulation material 11 for receiving a coin. When a coin drops through the chute it will strike the switch 10 and force the contact 12 thereon against the contact terminal 13 and thus complete the circuit through the conductors 14 and 15 to the solenoid 16, the armature 17 of which is connected by a chain 18 with a weight 19 which has its lower part provided with a cup-washer 20 and engaging the cylinder 21. The weight 19 acts to keep the armature 17 in raised position and the lower part of the weight and the cylinder act as a dash pot for retarding the downward movement of the weight. The chain 18 passes over a sprocket 22 to which is connected a switch arm 23 of spring metal, the end of which is adapted to engage an inclinedly arranged block 24 of insulating material which has a metal strip 25 on its front face which is connected by the conductor 26 with a lamp 27 of the illuminating means 5 which is in turn connected by the conductor 28 with the source of supply. The switch arm 23 is connected by the conductor 29 with the source so that when the arm is in engagement with the contact strip 25 on the front face of the block 24 the lamp will be lighted. A small contact 30 is spaced from the strip 25 so that it will be engaged by the front face of the arm 23 as the same passes over the strip 25 and thus current will be supplied to a motor 31 by the conductors 32 through the switch arm and the conductor 29. As will be seen when the solenoid is energized the switch arm will be swung to the left in Figure 4, but as it engages the rear face of the block the circuits will not be completed but as soon as the arm leaves the block it will spring forwardly, it being bent by its engagement with the inclined block, and then when the weight 19 starts to move the arm to the right it will first engage the contact strip 25, completing the circuit to the lamp 27 and then it will engage the contact 30 to complete the circuit to the motor 31. The dash pot arrangement will cause the arm to move over the contacts very slowly so that the lamp will remain ignited for some time.

The armature 17 is provided with a screw threaded bore to receive a screw threaded shaft 33 which can be locked in adjusted position by the nut 34. This shaft will engage a pivoted lever 35 when the armature is attracted by the magnet so as to swing the pivot part 8 of the chute to open position by means of the cable 36 which passes over the guide rollers 37. Thus the coin will be released and it will drop into a suitable receptacle. When the armature 17 is drawn upwardly the lever 35 will return to its normal position under the action of the spring 9 on the part 8 of the chute so that the parts of the chute will be in a position to receive another coin. As soon as the coin drops from the chute the switch 10 will return to its normal position and thus the circuit to the solenoid will be broken.

Figures 11, 14, 15, 16, 17, 18, 19:
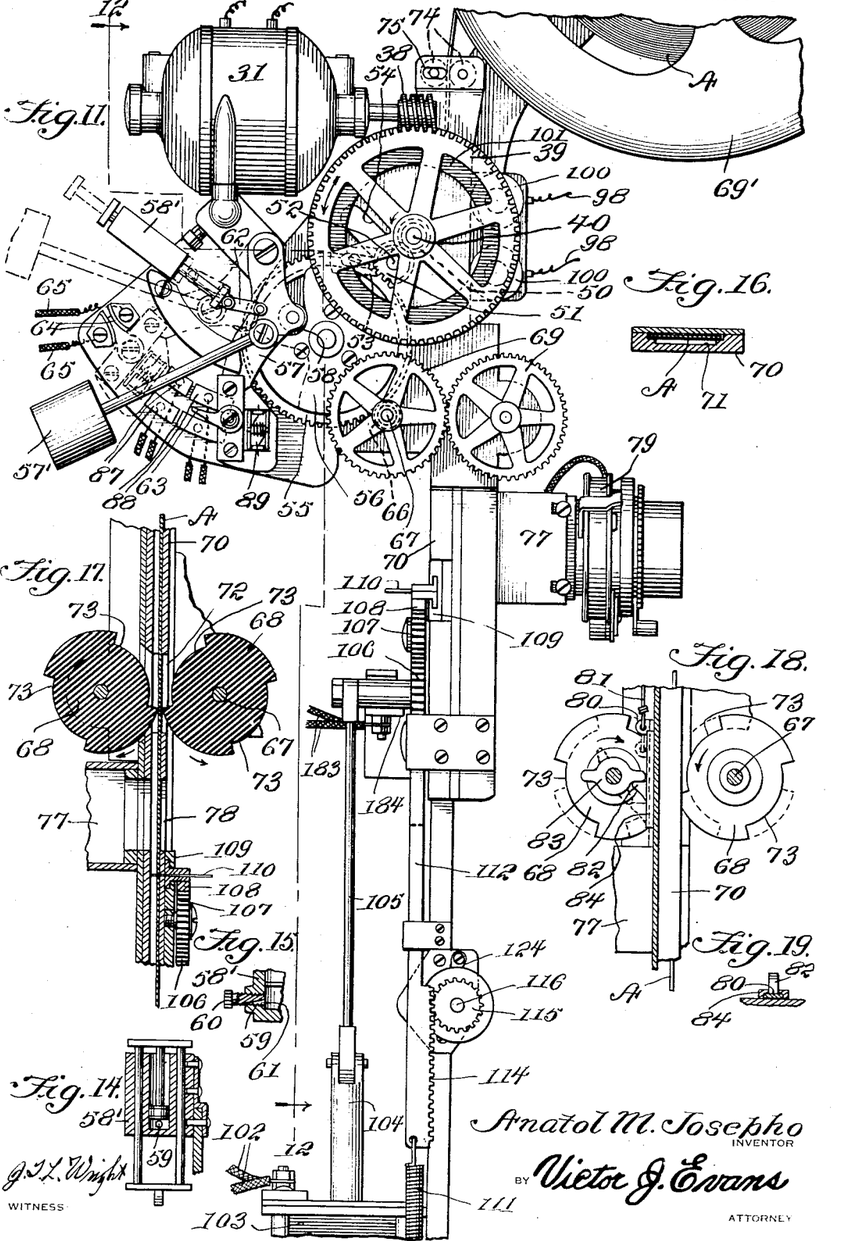
Figure 11 is an enlarged side view of the camera part of the apparatus.
Figures 14 and 15 are sectional detail views of the dash pot for the weighted arm.
Figure 16 is a transverse sectional view through the chute for the sensitized strip.
Figure 17 is a longitudinal sectional view through a portion of the chute and showing the feed rollers and the cutting means.
Figure 18 is an end view of the feed rollers and showing the means for operating the shutter.
Figure 19 is a transverse sectional view through the shutter operating slide.
Figure 12:
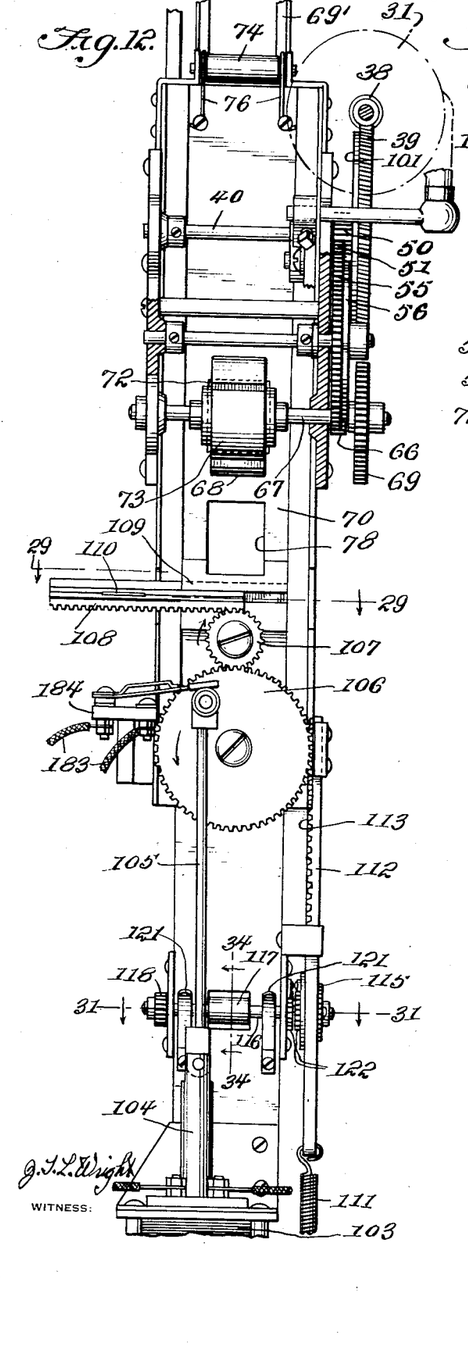
Figure 12 is a section on line 12—12 of Figure 11.
Figure 13:
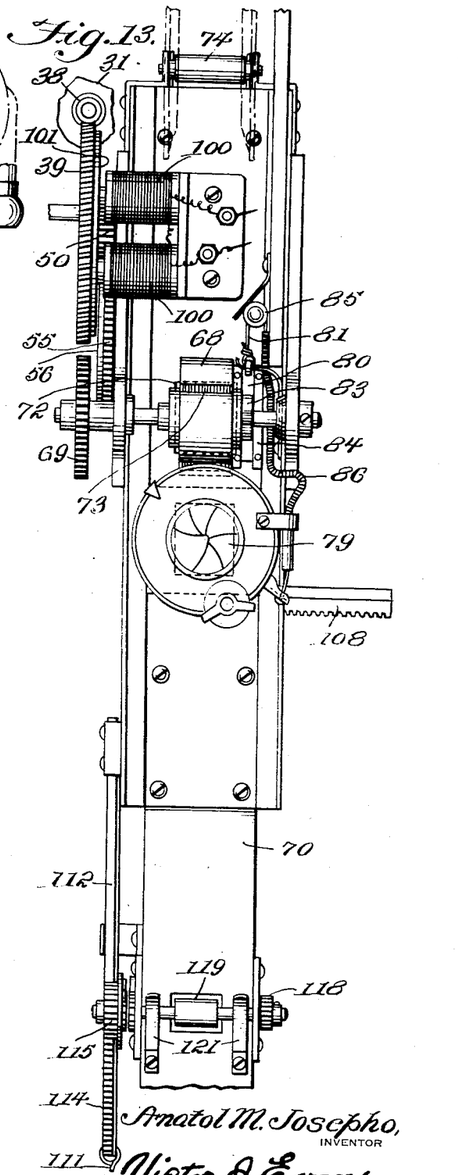
Figure 13 is a view showing the opposite side from that shown in Figure 12.
Figures 20, 21, 22, 23, 24, 25:
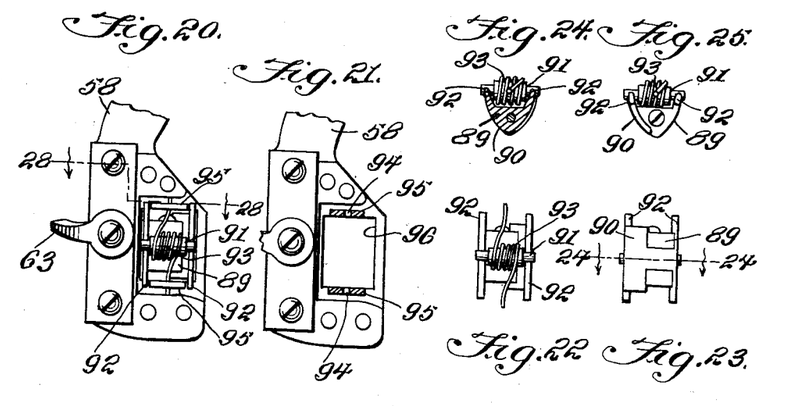
Figure 20 is a detail view of the switch carrying parts of the weighted switch arm.
Figure 21 is a similar view but showing the oscillating switch removed.
Figure 22 is an elevation of the oscillating switch.
Figure 23 is a view of the opposite side of said switch.
Figure 24 is a section on line 24—24 of said switch.
Figure 25 is an end view thereof.

The shaft of the motor 31 is provided with a worm 38 which meshes with a gear 39, the shaft 40 of which carries a pinion 50 which engages a pinion 51, the shaft 52 of which is carried by a pivoted bracket 53 which has a part working in a slot 54 so that the pinion 51 can be removed and replaced by another one of different size in order to time the actuation of the parts of the apparatus. The pinion 51 engages a gear 55 which carries a cam 56 for operating the weighted switch arm 57 which carries a roller 58 for engaging the cam 56. This switch arm is provided with a weight 57' and a dash pot 58' acts to check the downward movement of the switch arm under the action of the weight. As shown in Figures 14 and 15, the dash pot is provided with an exhaust port 59 which is controlled by a screw 60 which has a beveled slot 61 therein so that the size of the pot can be controlled by adjusting the screw in the port. The dash pot 21 is also made with this port and screw. The dash pot 58' is connected with the switch arm by the link 62. Thus the switch arm will be quickly raised by the cam 56 as soon as the motor begins to operate and the weight 57' will cause it to return to its lowest position. However this return action is comparatively slow owing to the retarding action of the dash pot 58'. The switch arm carries a knife contact 63 which will engage the contact terminals 64 when the switch arm is in raised position so as to complete another circuit to the motor through the conductors 65. Thus the motor is given its initial operation by the movement of the switch arm 24 through the contact 30 and before the motor ceases to operate the other circuit is closed by the contact 63 on the switch arm 57 engaging the terminal contacts 65. The gear 55 meshes with a pinion 66 on the shaft 67 of one of the feed rollers 68 and the shafts of the two feed rollers carry the gears 69 so that the rollers will rotate in unison. The strip of sensitized material, shown at A, is carried by a reel 69' and the strip passes downwardly through a chute 70, a portion of the inner wall of which being recessed, as at 71, so as to prevent the coated surface of the strip being rubbed by said wall. The chute is provided with openings 72 for receiving portions of the feed rollers which are provided with cut away portions 73 so that when these cut away portions come opposite the strip the strip will be freed of the rollers and so will not be moved by the rollers. In this way a step by step movement is given to the strip by the rollers and where the rollers are provided with a pair of cut out parts each revolution of the rollers will give two movements of the strip. A pair of guiding rollers 74 are arranged at the top of the chute, the pintles of one of which work in slots 75 in the top of the chute and this roller is yieldingly held against the strip by the springs 76. A lens barrel 77 is carried by the chute, below the feeding rollers, and I prefer to provide an opening 78 in rear of the lens barrel so as to provide access to these parts when desired. The usual spring shutter 79 is carried by the barrel and this shutter is actuated from one of the feed rollers by means of the slide 80 which is connected with the arm of the shutter by the cable 81 and which has a projection 82 thereon which is engaged by a pair of arms on a member 83 secured to the shaft of one of the feed rollers. These parts are so arranged that the shutter will be actuated when the strip comes to rest due to its being disengaged by the feed rollers. The slide 80 operates in the guides 84 and the cable 81 passes over a guiding pulley 85 and through a flexible tube 86.

A pair of terminal contacts 87 and a second pair of terminal contacts 88 are arranged to be engaged by an oscillating switch 89 which is carried by the switch arm 57. This switch 89 is composed of an insulated body of tapered shape with contact plates 90 on one of its sloping walls for bridging the terminal contacts 87 and 88. A roller 91 has its pintles engaging notches in the flanges 92 at the large end of the body and this roller carries a coil spring 93, the ends of which engage holes 94 formed in ears 95 on the switch arm. Thus the body 89 is yieldingly and rotatably supported in the switch arm and it is limited in its rocking movement by its flanges 92 striking the walls of the opening 96 formed in the switch arm to receive the body.

Figure 26:
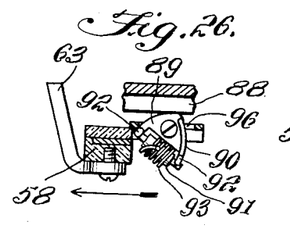
Figure 26 is a sectional detail view showing the position of the switch when the switch arm is being raised.
Figure 27:
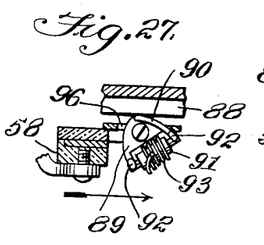
Figure 27 is a similar view but showing the position of the parts when the switch arm is being lowered.
Figure 28:
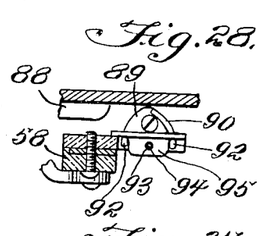
Figure 28 is a similar view showing the oscillating switch in neutral position.
Figure 29:
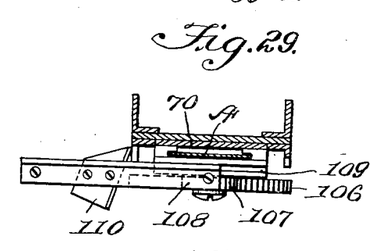
Figure 29 is a section on line 29—29 of Figure 12.
Figure 34:
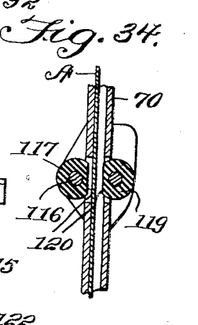
Figure 34 is a section on line 34—34 of Figures 12 and 31.

From the above it will be seen that when the switch arm is in its lowered position the switch 89 will be held in a neutral position by its spring, as shown in Figure 28. As the switch arm rises however, the body will strike the switch terminals 87 and 88 and it will thus be tilted, as shown in Figure 26, so that the insulated body will engage the contacts and the circuits will not be closed. On the return movement of the switch arm, however, the switch 89 will be tilted in an opposite direction, as shown in Figure 27, so that the metal parts thereof will bridge the terminal contacts 87 and 88 to complete the circuits in which these contacts are located. The contact terminals 87 are connected by the conductors 98 to a battery 99 and the magnets 100 which are arranged to attract a member 101 on the gear 39 and thus act as a magnetic brake for the parts so that as the switch arm moves downwardly the switch 89 will bridge the contacts 87 and thus supply current to the magnetic brake and thus stop the parts. The wheel 58 of the switch arm will then be in a position to enter the opening in the cam and as the switch arm continues its movement, due to the roller entering the opening in the cam, the switch 89 will engage the terminal contacts 88 which are connected by the conductors 102 with the main source of supply and with a solenoid 103, the core 104 of this solenoid being connected by the rod 105 with the crank gear 106 which meshes with a gear 107 which in turn engages a rack 108 which moves horizontally in a guide 109 attached to the chute for the sensitized strip, below the lens barrel, and this rack carries a knife 110 for severing that part of the strip which has passed the lens barrel. These parts are returned to normal position by means of the spring 111 which is attached to a stationary part and to a rack bar 112 which has one set of teeth 113 engaging teeth on gear 106 and another set of teeth 114 meshing with the gear 115 which is loosely arranged on a shaft 116 of a feed roller 117. This shaft is connected by the gears 118 with the shaft of the second feed roller 119. These rollers operate in openings in the chute 70 and they are designed to cause the severed part of the strip to pass downwardly from the chute. Each feed roller is provided with a flat part 120 so that the strip will not be engaged by the rollers until it has been severed by the knife. The shafts for the feed rollers are movably mounted in their bearings and are pressed towards each other by the springs 121 so that they will yieldingly grip the strip. The shaft 116 is provided with a pair of ratchet wheels 122, one of which is arranged to be engaged by a pawl 123 on the gear 115 and the other one of which is engaged by a pawl 124 on a stationary part. Thus the shaft 116 will only be rotated on the downward stroke of the bar 112 as the pawl 123 will ratchet over the ratchet wheel on the upward stroke of the bar.

Figure 3:
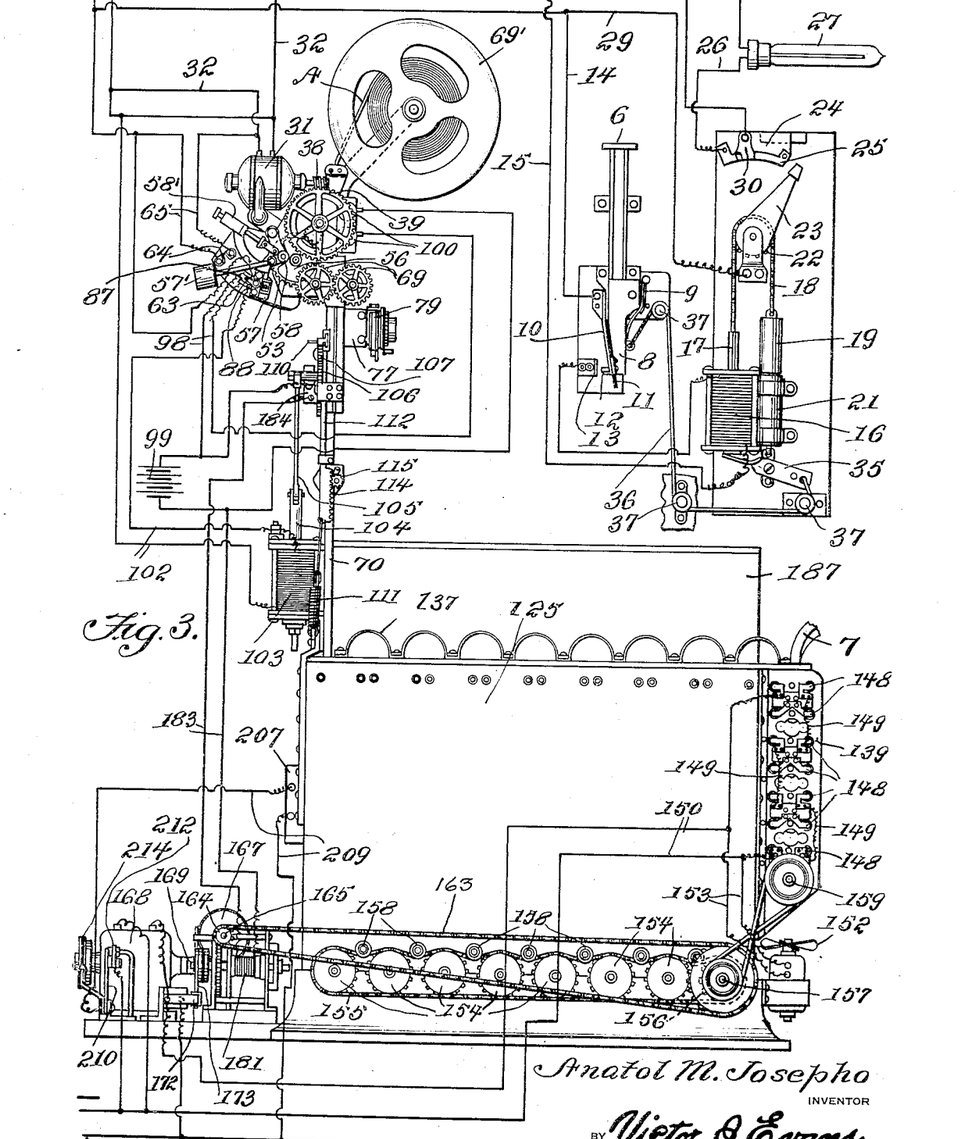
Figure 3 is a diagrammatic view of the entire apparatus.

A developing compartment 125 is arranged to receive the severed part of the strip from the chute 70. This developing tank and its operating means forms no part of the present invention and is not shown in detail. However, it may be said, with reference to Figure 3, that a switch indicated at 184 may be thrown into action by the solenoid 103, during the severing of the strip, the switch closing a circuit through conductors 183 either directly or indirectly to a motor 168 for driving a shaft 165 carrying a sprocket wheel 164, the latter driving a chain 163 connected to a driving element for a conveyor of suitable construction for carrying the strip through a plurality of tanks within the developing compartment 125, the strip then passing through a drying compartment indicated at 139 and passing out of delivery chute 7.

From the foregoing it will be seen that my apparatus will take a plurality of exposures of a person sitting in the chair so as to register different expressions and emotions displayed by him while he is sitting in the chair. The part of the strip containing the exposures will then be severed from the main strip and deposited in the developing part of the apparatus where it may be developed and otherwise treated to make a permanent and positive picture of the sitter.

The depositing of a coin in the apparatus acts to move the switch arm 23 to supply current to the illuminating means and to start the motor 31. These same means releases the coin and these means also include the means for controlling the time it takes for the arm to pass over the contact 25 so that the lamp can remain lighted for a sufficient amount of time. The initial movement of the motor 31 raises the switch arm so as to connect the motor with a source of supply and the action of the motor will rotate the feed wheels which give the sensitized strip a step by step movement and one of these wheels in turn operates the shutter so that the shutter is only open, when the strip is at rest. The downward movement of the switch arm applies the magnetic brake and actuates the cutter to sever the exposed part of the strip from the main part. The return movement of the cutting mechanism serves to operate the lower feed rollers which act to force the severed part of the strip into the developing tank.

I prefer to so arrange the parts that twelve exposures will be taken of the sitter in about ten seconds and in this case it will take about six minutes for the strip to be delivered at the outlet chute from the time the coin is deposited in the apparatus. It will of course be understood, however, that the time would vary under different conditions and as many pictures can be taken on a single strip as desired.

I prefer to have the lamp contact of such a length that the lamp will be lighted a short time before the picture part of the apparatus becomes active so as to give the sitter time to adjust himself and the lamp will remain ignited a short time after the picture part has ceased to function. When the lamp is extinguished the sitter will know that he can leave the seat.

The apparatus can be placed in public places, such as amusement parks, railroad stations and the like, though of course, it can be placed in any other place and while the drawings show it in a cabinet frame it will of course be understood that it can be provided with other supporting and enclosing means.

The means for closing the circuit to the motor by the switch arm and its associated parts permits a more accurate adjustment than could be secured if the motor circuit was controlled entirely by the switch blade 23 and the contact 25.

The coin chute, as shown in Figure 5, has its lower part cut-away so that if an attempt is made to run the apparatus with small coins they will drop from the chute and any suitable means can be used for preventing counterfeit coins from being placed in the apparatus.

The strips used in this apparatus may be of the type now on the market, where the pictures are first developed by suitable solutions and then the negatives changed to positives by other solutions so that no printing is required as in taking pictures on films and printing positives on paper.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In photographic apparatus for taking a series of pictures in sequence upon a unitary strip, a camera having an exposure field, means for moving a flexible sensitized strip through the exposure field step by step, means for severing the exposed portion of said strip, driving apparatus for said two means, and an automatic control for said driving apparatus effective to limit the film moving steps to sequences each of a predetermined number of steps only, and to cause actuation of said severing means upon the completion of each sequence of exposures.

2. In photographic apparatus for taking a series of pictures in sequence upon a unitary strip, a camera having an exposure field, means for moving a flexible sensitized strip through the exposure field step by step, means for severing the exposed portion of said strip, driving apparatus for said two means, and an electrical control for said driving apparatus effective to limit the film moving steps to sequences each of predetermined number of steps only and to cause actuation of said severing means upon the completion of each sequence of exposures.

3. An apparatus of the class described, comprising a lens-carrying member, a shutter associated therewith, means for feeding a sensitized strip step by step past the said member, means for operating the shutter, a motor for operating the feeding means, a circuit for the motor, means for initially closing the circuit, and switch closing means actuated by the motor for supplying current thereto after the initial means has become inactive.

4. An apparatus of the class described, comprising a lens-carrying member, a shutter associated therewith, means for feeding a sensitized strip step by step past the lens for a predetermined number of steps only, means for operating the shutter, a motor for operating the feeding means, a switch arm, a cam member actuated by the motor for raising the arm, means for retarding the downward movement of the arm, a circuit for the motor, means for closing the circuit when the switch arm reaches a predetermined position, a switch on the switch arm, severing means for the exposed portion of the strip, magnetic means for operating the same, a circuit for the magnetic means, and means for closing the circuit by the switch on the switch arm.

5. An apparatus of the class described, comprising a lens-carrying member, a shutter associated therewith, means for feeding a sensitized strip step by step past the said member, means actuated thereby for operating the shutter, a motor for operating the feeding means, means for supplying current to the motor, means for severing the exposed part of the strip, a toothed wheel for actuating such means, magnetic means for operating said wheel, means controlled by the motor for supplying current to the magnetic means, a rack bar engaging the toothed wheel, means carried thereby for returning the parts to normal position when the circuit of the magnetic means has been broken, feed rollers for engaging the severed part of the strip, and means for operating the feed rollers by the rack bar on its downward movement.

6. An automatic portrait photographic apparatus for taking a plurality of successively different portraits of a person upon a unitary strip, comprising a camera having an exposure field, a shutter, shutter-actuating means for successively exposing and light-shielding the strip, means for engaging said strip and feeding the same through the exposure field step by step in sequences each of a predetermined number of steps only, and driving means coacting with the strip feed in said operation and to effect a dwell between individual exposures sufficient to enable the person to change his pose.

In testimony whereof I affix my signature.

ANATOL M. JOSEPHO.